(12) United States Patent
Alsina et al.

(10) Patent No.: US 10,791,197 B2
(45) Date of Patent: Sep. 29, 2020

(54) MANAGING ACCESS TO MEDIA ACCOUNTS

(71) Applicant: Apple Inc., Cupertino, CA (US)

(72) Inventors: Thomas Alsina, Saratoga, CA (US); Zhiyuan Zhao, Saratoga, CA (US); Kenneth C. Barry, Mountain View, CA (US); David K. Heller, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 124 days.

(21) Appl. No.: 15/693,138

(22) Filed: Aug. 31, 2017

(65) Prior Publication Data

US 2018/0213059 A1    Jul. 26, 2018

Related U.S. Application Data

(60) Provisional application No. 62/448,505, filed on Jan. 20, 2017.

(51) Int. Cl.
*H04L 29/06* (2006.01)
*H04L 29/08* (2006.01)

(52) U.S. Cl.
CPC .......... *H04L 67/306* (2013.01); *H04L 63/102* (2013.01); *H04L 67/26* (2013.01)

(58) Field of Classification Search
None
See application file for complete search history.

(56) References Cited

U.S. PATENT DOCUMENTS

| 2012/0129489 A1* | 5/2012 | Cassidy ................ G06F 16/435 |
| | | 455/406 |
| 2014/0123312 A1 | 5/2014 | Marcotte |
| 2014/0248852 A1* | 9/2014 | Raleigh ............... H04M 15/723 |
| | | 455/407 |
| 2016/0006737 A1 | 1/2016 | Barraclough et al. |

* cited by examiner

*Primary Examiner* — Cai Y Chen
(74) *Attorney, Agent, or Firm* — Fletcher Yoder PC

(57) ABSTRACT

In some implementations, a computing system can manage access to media sources associated with a user's media account. For example, the system can coordinate access to a user's media account between local and network devices such that when access to the user's media account is granted to an application on a user device, the application can access both local and network media sources associated with the user's media account. Similarly, when access to the user's media account is revoked from an application at a user device or at a network device, the application is prevented from accessing both local and network media sources associated with the user's media account.

18 Claims, 10 Drawing Sheets

MANAGING ACCESS TO MEDIA ACCOUNTS

RELATED APPLICATION

This application claims priority to U.S. Provisional Application No. 62/448,505, filed on Jan. 20, 2017, the content of which is incorporated herein by reference in its entirety.

TECHNICAL FIELD

The disclosure generally relates to managing access to local and network media sources.

BACKGROUND

Users of computing devices, such as smartphones, tablet computers, wearable devices, and the like, often use these computing devices to manage and/or access media from a variety of media sources. For example, a user may have a local media library on the computing device from which the user can playback music, videos, movies, and other media items. In some cases, the user may also have a subscription to an online media service. The user can use the computing device to access media items from the online media service, for example. In some instances, the online media service and the user's local media library can be tied to the same user account and/or online media service.

Some computing device may include applications that are configured to interact with the user's local media library and/or online media service account. For example, a third party software application installed on the computing device may make media item recommendations based on the media items in the user's local media library and/or media items that the user has recently played through the online media service. Thus, a system is needed that allows the user to quickly and easily manage access to both local and online media sources.

SUMMARY

In some implementations, a computing system can manage access to media sources associated with a user's media account. For example, a user can provide input to a user device granting an application on the user device access to both a local media library and a network media service associated with the user's media account. The user device can request an access token for accessing the user's media account with the network media service and the user device can provide the access token to the application.

In some implementations, a user can provide input to the user device to revoke the application's access to the user's media account. In response to receiving the input, the user device can prevent the application from accessing the local media library and send a message to the network media service to invalidate the access token associated with the application on the user device. Thus, the application will no longer be able to access the local media library and the user's media account with the network media service.

In some implementations, the user can provide input to an account administration interface of the network media service to revoke an application's access to the user's media account with the network media service. In response to receiving the input, the network media service can invalidate the access tokens previously generated for instances of the application on each user device and send a message to each user device indicating that the application is no longer authorized to access the local media library on the device. Upon receiving the message, the receiving user device can change the settings of the user device to prevent the application from accessing the local media library on the user device. Thus, the application will no longer be able to access the local media library and the user's media account with the network media service.

Particular implementations provide at least the following advantages. A user need only provide a single user input to disable an application's access to both local and network media sources associated with the user's media account. Because access is controlled on an per device basis, the user has greater control over which applications can access data on which user devices. By granting and revoking access at both a local device level and a network service level, an application's access to a user's media account can be made more consistent between local and network media services.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
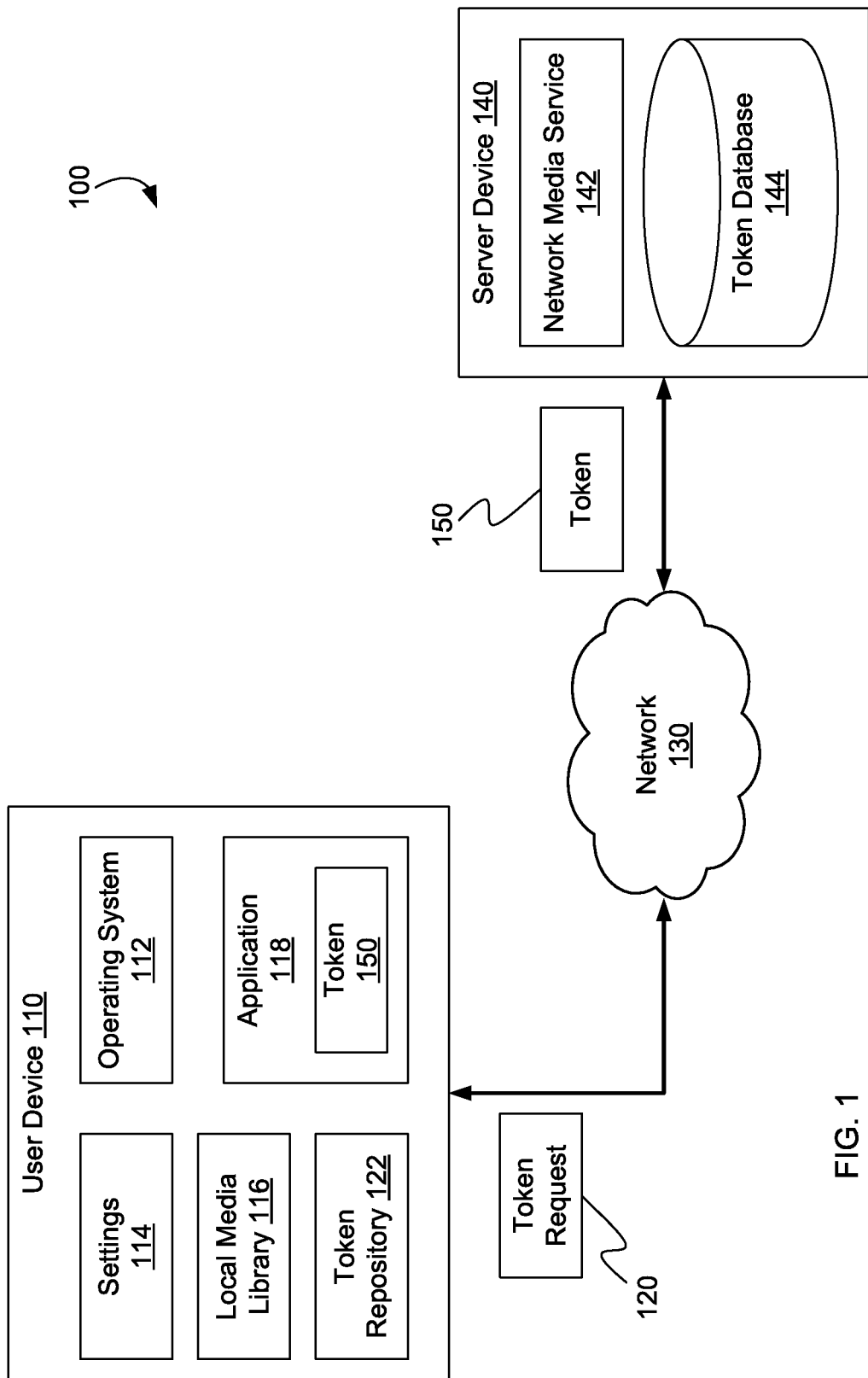
FIG. 1 is a block diagram of an example system for managing access to a user's media account at a user device.

FIG. 1 is a block diagram of an example system 100 for managing access to a user's media account at a user device. For example, system 100 can enable (e.g., grant) and/or disable (e.g., revoke) an application's access to a user's media account, including the user's local media library and the user's account with a network media service, based on user input received at a local device (e.g., user device 110) and/or user input received at a remote device (e.g., server device 140). System 100 can manage the application's access to the user's media account such that the application's access to the local media library and the application's access to the user's account with the network media service is consistent between local and remote devices.

In some implementations, system 100 can include user device 110. For example, user device 110 can be a computing device, such as a desktop computer, laptop computer, smartphone, tablet computer, and the like. User device 110 can be a wearable device, such as a smart watch, smart glasses, and similar devices. User device 110 can be operated by a single user. User device 110 can be operated by multiple users who have different accounts on user device 110.

In some implementations, user device 110 can include operating system 112. For example, operating system 112 can be a software system that controls basic and/or core functionality of user device 110. Operating system 112 can control communication interfaces, core software frameworks, core system functions, etc., of user device 110. For example, applications running on user device may interact with application programming interfaces (APIs) of operating system 112 to communicate with other devices and/or access local data on user device 110, such as local media library 116.

In some implementations, user device 110 can include settings 114. For example, settings 114 can be settings managed by operating system 112 that define how various aspects of operating system 112 and/or user device 110 should work. For example, settings 114 can include privacy settings that define which applications on user device 110 can access a user's media account (e.g., local media library 116 and/or the user's account with network media service 142). A user can interact with a privacy settings graphical user interface (GUI) presented by operating system 112 to enable and/or disable an application's access to the user's media account on user device 110 and server device 140.

In some implementations, user device 110 can include local media library 116. For example, local media library 116 can be a repository (e.g., database) of media items stored locally on user device 110. Local media library 116 can include digital media items such as music, movies, talk shows, electronic books, etc., associated with the user's media account. For example, the user may have a media account with an online media vendor through which the user purchases, rents, or streams media items. The media account can be a subscription account through which the user can be provided access by the online media vendor to music, movies, television shows, and/or other media items such as electronic books, radio talk shows, etc. The media items in local media library 116 can include media items purchased, rented, temporarily downloaded through the user's subscription, and/or streamed from the online media vendor. The media items in local media library 116 can include media items obtained from physical storage devices (e.g., compact discs, DVDs, or other recording media) purchased from physical brick and mortar media merchants.

In some implementations, user device 110 can include application 118. For example, application 118 can be an application that is configured to use media data obtained through the user's media account (e.g., local media library 116 and/or the user's account with network media service 142) to provide some service to the user. Application 118 can be an application created by the vendor of user device 110. Application 118 can be an application created by a third party vendor.

To enable access to the user's media account, application 118 can invoke a media access request API of operating system 112 to request access to the user's media account. When the API is invoked, operating system 112 can present a prompt on a display of user device 110 prompting the user to provide input (e.g., select a confirmation button) allowing application 118 access to the user's media account. When the user provides input allowing (e.g., granting) application 118 access to the user's media account, operating system 112 can modify settings 114 (e.g., privacy settings) to indicate that application 118 is allowed to access the user's media account. For example, the operating system 112 can store data in settings 114 that maps an application identifier for application 118 to the corresponding media access setting (e.g., media access allowed/granted). After the data in settings 114 is modified to allow application 118 access to the user's media account, application 118 can use APIs of operating system 112 to access local media library 116. For example, operating system 112 can control access (e.g., allow or deny access) to local media library 116 based on the privacy and/or media access settings in settings 114.

In addition to modifying settings 114 to allow access to local media library 116, operating system 112 can enable access to a network media service associated with the user's media account. For example, operating system 112 can send token request 120 to network media service 142 on server device 140 through network 130 (e.g., the Internet, LAN, WAN, etc.) to obtain a token that will allow application 118 to access the user's account with network media service 142.

In some implementations, system 100 can include server device 140. For example, server device 140 can be a computing device that operates to provide network media service 142. Network media service 142 can be, for example, a streaming media service that provides users who have registered user accounts with network media service 142 access to media items, such as music, movies, audio books, talk shows, etc. For example, the user of user device 110 can use user device 110 to access network media service 142. Network media service 142 can stream media items selected by the user to user device 110 and user device 110 can present the media items to the user. In some implementations, network media service 142 may collect data that describes the user's media consumption habits.

Applications on user device 110 (e.g., application 118) may obtain the data collected by network media service 142 to provide additional features, services, or functionality to the user of user device 110 when access to the user's account with network media service 142 is granted to the applications by the user of user device 110. Thus, when network media service 142 receives token request 120 from user device 110, network media service 142 can generate an access token that application 118 can use to access the user's account with network media service 142.

In some implementations, network media service 142 can receive token request 120. For example, token request 120 can include an application identifier for application 118, a user identifier for the user of user device 110, a user device account identifier corresponding to the user login for user device 110 (e.g., when user device 110 is a multiuser device), and/or a device identifier for user device 110. In response to receiving token request 120, network media service 142 can generate a token (e.g., access token) that allows application 118 to access the user's account at network media service 142. Each token generated by network media service 142 can be application, user, and device specific. Thus, even though multiple devices owned by the same user include an instance of application 118, network media service 142 can generate a different access token for each instance of application 118 on the different user devices. When a user device is a multiuser device, network media service 142 can generate a different access token for each user (e.g., each user account or login on a device) who uses a particular application instance on a particular device. Network media service 142 can store the generated access token in token database 144 in association with the application identifier, user identifier, user device account identifier, an issuance timestamp indicating the date and/or time when the token was generated and/or issued to the application associated with the application identifier, a revocation timestamp indicating the date and/or time when the token was revoked (if the token was revoked), and/or device identifier received in token request 120. Network media service 142 can send the access token (e.g., token 150) to operating system 112 on user device 110.

In some implementations, operating system 112 can receive token 150 from network media service 142. For example, when operating system 112 receives token 150 from network media service 142, operating system 112 can store token 150 in association with the application identifier for application 118 in token repository 122. Application 118 can obtain token 150 from token repository 122 or operating system 112 can send token 150 to application 118. Application 118 can then use token 150 to access the user's account at network media service 142. For example, when application 118 sends a request to network media service 142, application 118 can send token 150 with the request. Network media service 142 can use token 150 to determine whether application 118 is authorized to access the user's account with network media service 142. For example, if the token provided by application 118 corresponds to a valid or active token in token database 144, then network media service 142 can allow application 118 to access the user's account with network media service 142.

Figure 2:
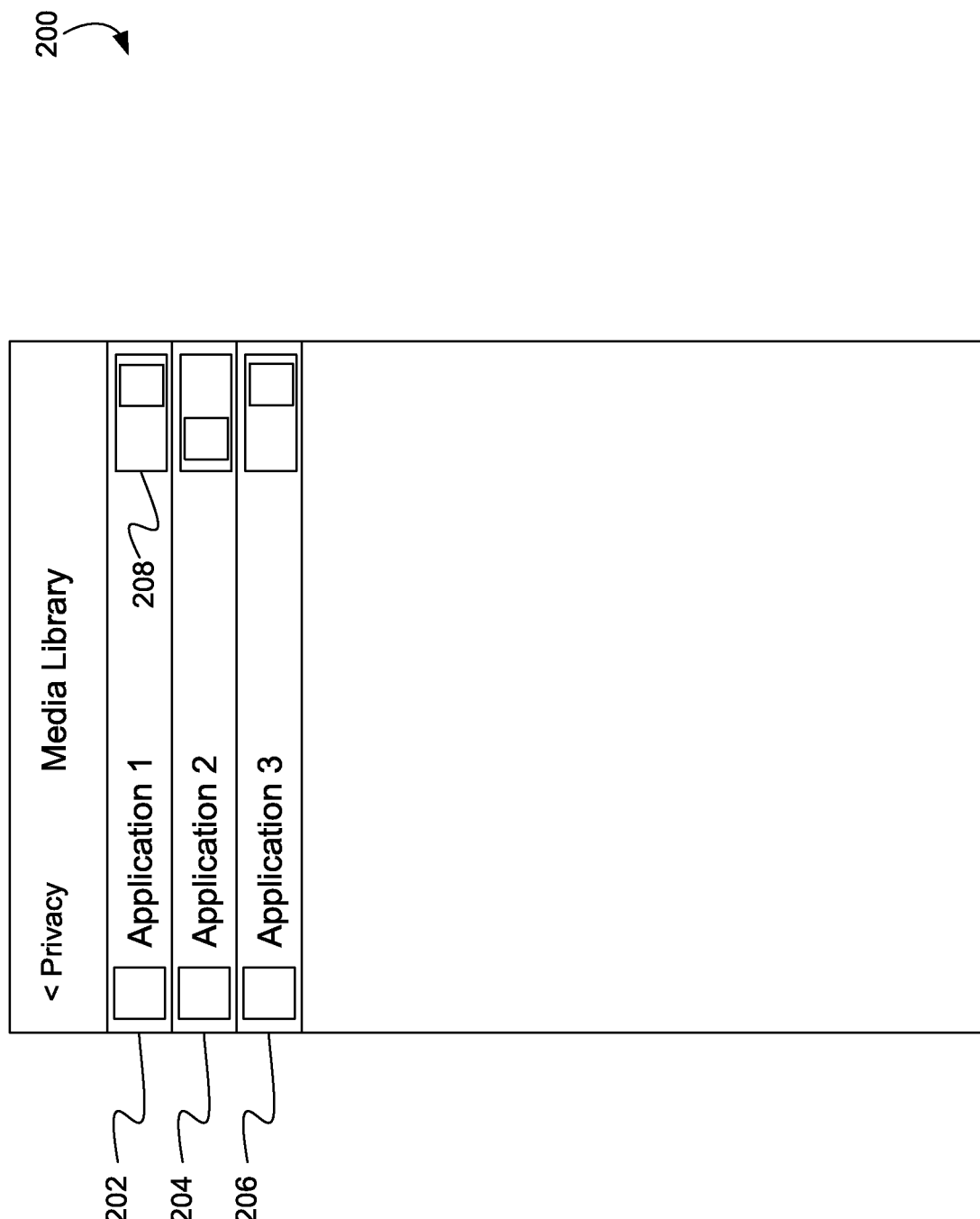
FIG. 2 illustrates an example graphical user interface for managing access to a user's media account.

FIG. 2 illustrates an example graphical user interface 200 for managing access to a user's media account. For example, GUI 200 can be presented by operating system 112 on a display of user device 110 in response to receiving user input indicating that the user wishes to view privacy settings associated with the user's media account.

In some implementations, GUI 200 can identify applications installed on user device 110. For example, GUI 200 can include graphical elements 202, 204, and/or 206 identifying and/or representing applications currently installed on user device 110. Each graphical element 202, 204, and/or 206 can have a corresponding selectable element 208 for modifying the user media account access setting for the corresponding application. For example, the user can select graphical element 208 to enable and/or disable the corresponding application's access to the user's media account, including local media library 116 and/or the user's account with network media service 142. For example, if graphical element 202 corresponds to application 118 on user device 110, the user can select graphical element 208 to revoke or disable access to the user's media account for application 118. In response to receiving the user input revoking access to the user's media account, operating system 112 can store the revoked access setting for application 118 in settings data 114 to indicate that application 118 should not be allowed access to the user's media account.

Figure 3:
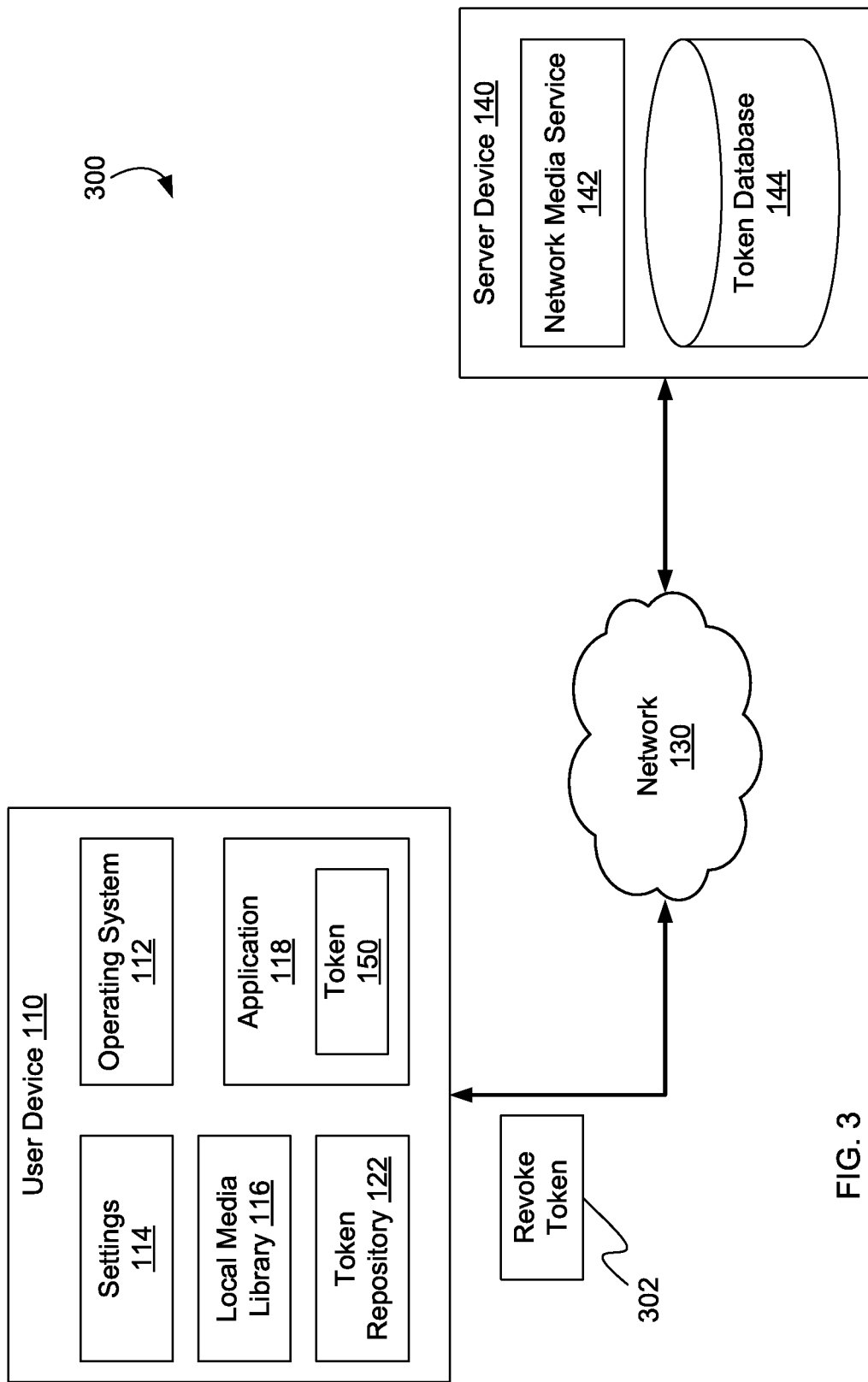
FIG. 3 is a block diagram of an example system for revoking an application's access to the user's media account at a user device.

FIG. 3 is a block diagram of an example system 300 for revoking an application's access to the user's media account at a user device. For example, system 300 can correspond to system 100 of FIG. 1.

In some implementations, system 300 can be configured to revoke an application's access to the user's media account. For example, the user of user device 110 can provide input to invoke a privacy settings GUI, as described above with reference to FIG. 2. The user can provide input to change the privacy setting associated with application 118 to revoke the application's access to the user's media account. In response to receiving the input revoking the application's access to the user's media account, operating system 112 can store data in settings 114 mapping the revoked or disabled access (e.g., a flag or value indicating whether the application has access to the user's media account) to the application identifier for application 118. When settings 114 indicates that application 118 is not allowed access to the user's media account, operating system 112 can prevent application 118 from accessing local media library 116 when application 118 invokes an API for accessing local media library 116.

Additionally, when the user revokes application 118's access to the user's media account by changing the privacy settings associated with application 118, operating system 112 can send a revoke token message 302 to network media service 142 to prevent application 118 from accessing the user's account at network media service 142. For example, revoke token message 302 can include the previously issued token 150. Revoke token message 302 can include an identifier for the user of user device 110, an identifier for user device 110 and/or an identifier for application 118.

When network media service 142 receives revoke token message 302, network media service 142 can find a token entry in token database 144 that corresponds to the token, application identifier, user identifier, and/or device identifier included in revoke token message 302. After finding the token entry, network media service 142 can delete the token and/or token entry from token database 144 or mark the token invalid in the token entry in database 144. For example, network media service 142 can mark the token invalid by entering a timestamp in the token entry indicating the date and/or time when the token was revoked. If application 118, or some other client, later attempts to use token 150 to access network media service 142, network media service 142 can look up token 150 in token database 144, determine that the token is missing or invalid, and prevent application 118 from accessing network media service 142. For example, network media service 142 can determine that token 150 is invalid by comparing token issuance and revocation timestamps. When the token revocation timestamp is later (e.g., more recent) than the token issuance timestamp, then network media service 142 can determine that the corresponding token is invalid. Thus, application 118 will be prevented from accessing both the local media repository 116 on user device 110 and the user's account on network media service 142 when the user revokes the application's access to the user's media account on user device 110.

Figure 4A:
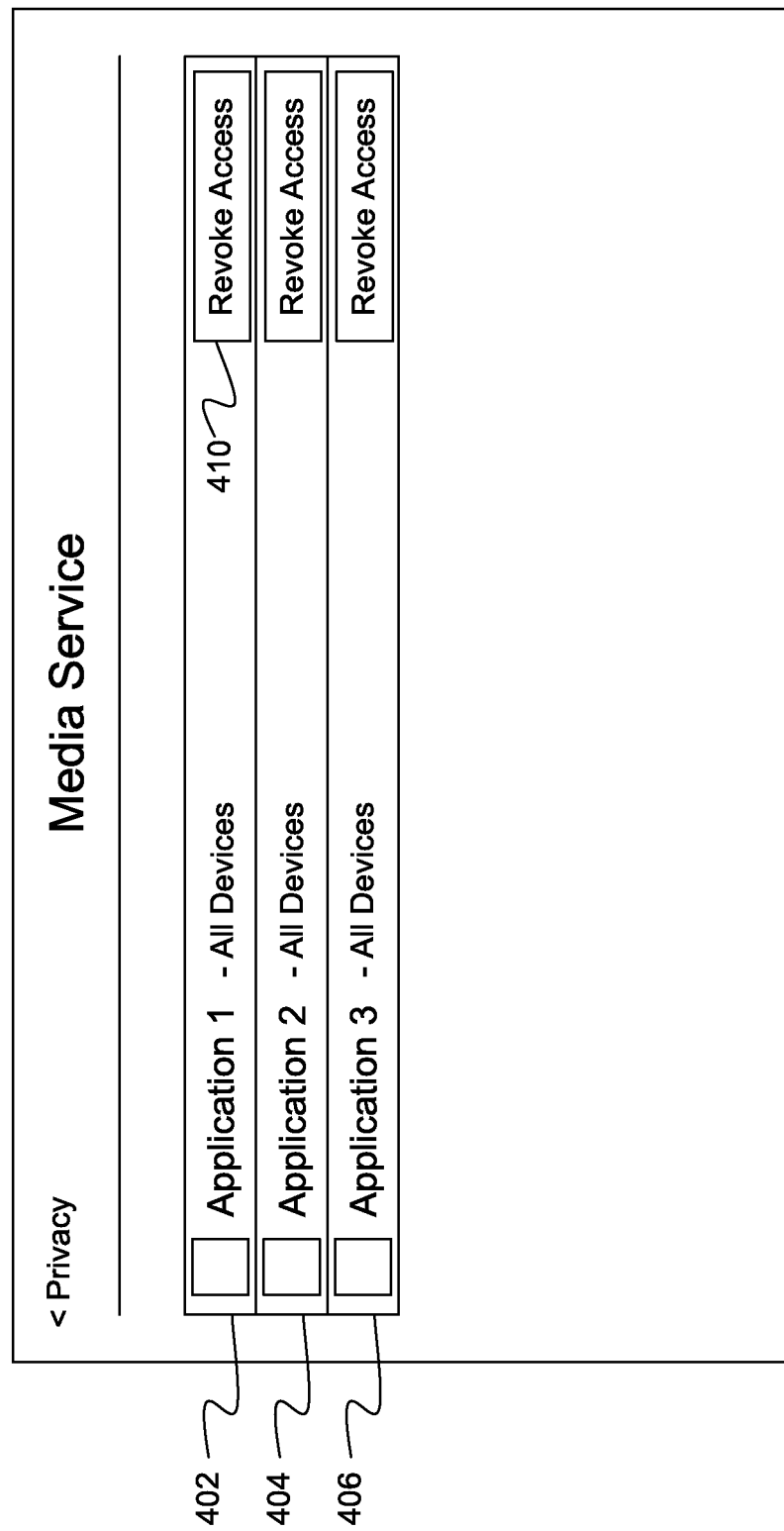
FIG. 4A illustrates an example graphical user interface for revoking an application's access to a network media service from all user devices.
Figure 4B:
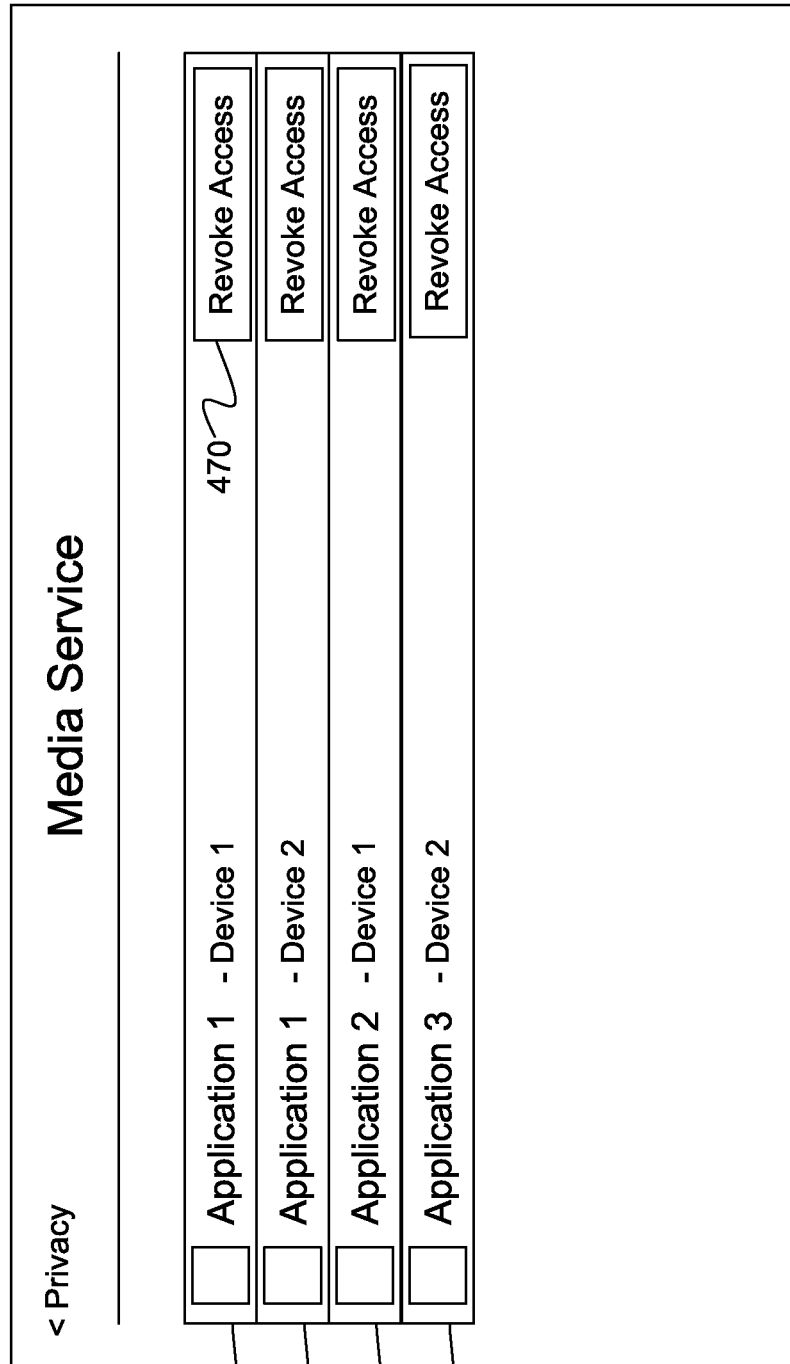
FIG. 4B illustrates an example graphical user interface for revoking an application's access to a network media service from a specific user device.

FIG. 4A and FIG. 4B illustrate example graphical user interfaces 400 and 450 for revoking an application's access to the user's media account from a network media service's user account administrative interface. For example, GUI 400 and GUI 450 can be user account administration web pages generated by network media service 142 and presented on a display of a user device through a web browser running on the user device. A user can use the web browser application on a computing device to login (e.g., provide user name and password or other authentication data) to network media service 142 and access GUI 400 and/or GUI 450 to adjust the privacy settings associated with the user's account with network media service 142. For example, the user can provide input to GUI 400 and/or GUI 450 to enable and/or disable an application's access to the user's media account, including the local media libraries on the user's devices and the user's account with network media service 142.

FIG. 4A illustrates an example graphical user interface 400 for revoking an application's access to a network media service from all user devices. For example, GUI 400 can include graphical elements 402, 404, and/or 406 corresponding to and identifying each application that has access to the user's account with network media service 142. For example, GUI 400 can present graphical elements 402, 404, and/or 406 corresponding to application that the user has previously authorized to access the user's media account. Stated differently, graphical elements 402, 404, and/or 406 can represent applications for which network media service 142 has generated access tokens (e.g., token 150) and for which token database 144 has token entries.

In some implementations, network media service 142 can receive user input revoking an application's access to the user's media account. For example, the user can select graphical element 410 corresponding to graphical element 402 to revoke the corresponding application's access to the user's media account. When the user selects graphical element 410 on GUI 400, the user is indicating that the user wishes to revoke the application's access to the user's media account across all of the user's devices. Thus, when network media service receives the selection of graphical element 410, network media service 410 can invalidate or delete all access tokens in token database 144 that are associated with both the user identifier of the logged in user and the application identifier of the application corresponding to graphical element 402. Network media service 140 can then send a message to each user device upon which the application is installed to cause the user devices to change the local privacy settings associated with the application to prevent the application from accessing the local media library on each device, as described in greater detail below.

FIG. 4B illustrates an example graphical user interface 450 for revoking an application's access to a network media service from a specific user device. For example, GUI 450 can include graphical elements 452, 454, 456, and/or 458 corresponding to and identifying each application instance, and corresponding devices that have access to the user's account with network media service 142. For example, rather than presenting a graphical element that represents all instances of an application across all devices, as illustrated by GUI 400, GUI 450 can present graphical elements 452, 454, 456 and/or 458 corresponding to individual application instances on individual user devices that the user has previously authorized to access the user's media account. Stated differently, graphical elements 452, 454, 456 and/or 458 can represent individual application instances on individual user devices for which network media service 142 has generated access tokens (e.g., token 150) and for which token database 144 has token entries. When a user device is a multiuser device, GUI 450 can present graphical elements similar to graphical elements 452, 454, 456 and/or 458 that represent individual user device accounts on individual devices that have granted access to corresponding application instances on those individual devices. Thus, a user can revoke an application's access to a particular user account on a particular user device.

In some implementations, network media service 142 can receive user input revoking an application instance's access to the user's media account. For example, the user can select graphical element 470 corresponding to graphical element 452 to revoke the corresponding application's access to the user's media account. When the user selects graphical element 470 on GUI 450, the user is indicating that the user wishes to revoke a particular application instance's access to the user's media account on a specific user device. Thus, when network media service receives the selection of graphical element 470, network media service 410 can invalidate or delete the access token in token database 144 that is associated with the user identifier of the logged in user, the application identifier of the application corresponding to graphical element 452, and the specific user device corresponding to graphical element 452. Network media service 140 can then send a message to the user device corresponding to graphical element 452 to cause the user device to change the local privacy settings associated with the application to prevent the application from accessing the local media library on the user device, as described in greater detail below.

Figure 5:
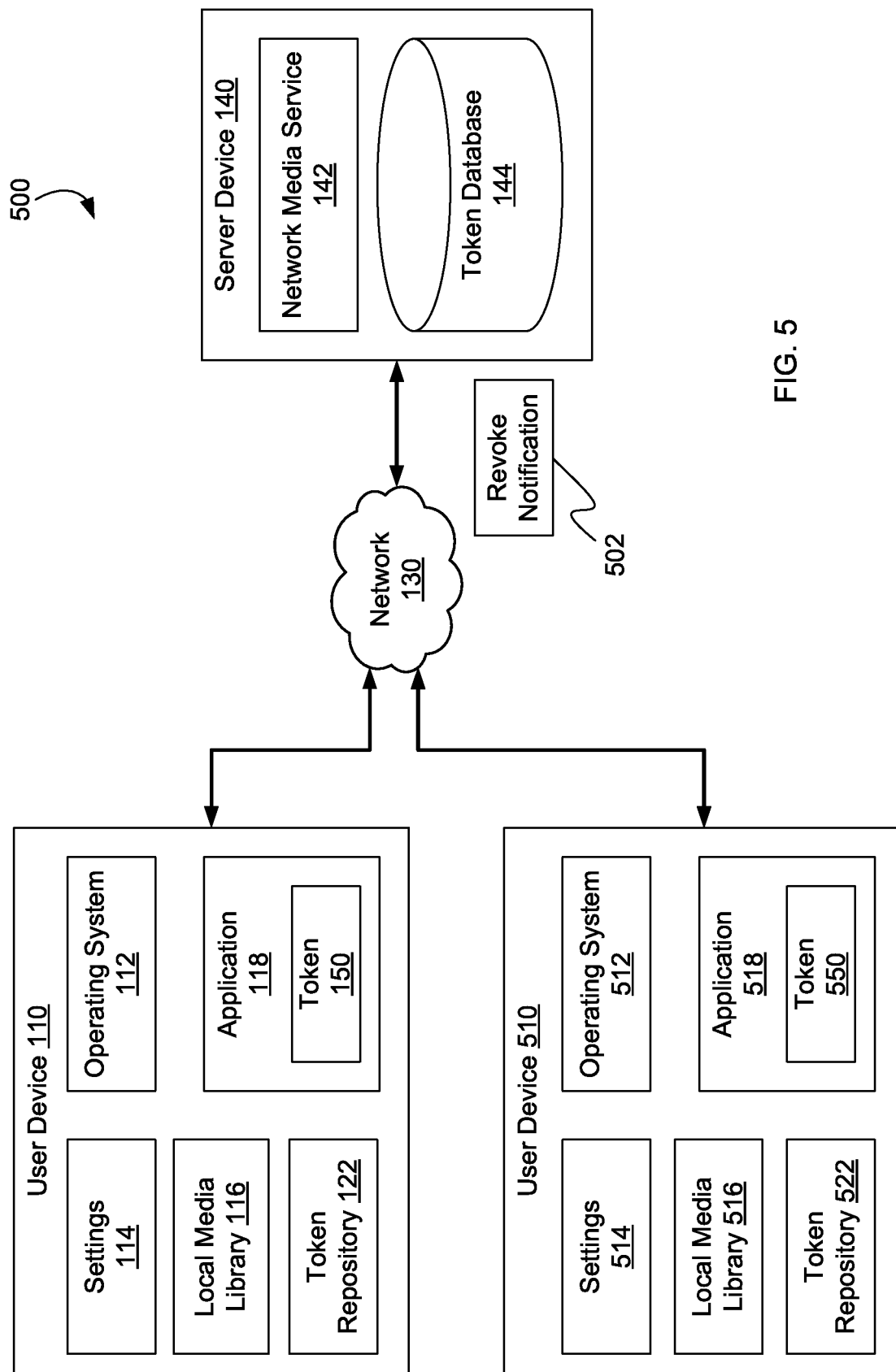
FIG. 5 is a block diagram of an example system for revoking an application's access to a user's media account from a network media service.

FIG. 5 is a block diagram of an example system 500 for revoking an application's access to a user's media account from a network media service. For example, system 500 can correspond to system 100 and/or system 300, described above.

In some implementations, system 500 can include user device 510. For example, user device 510 can be configured similarly to user device 110. User device 510 can include operating system 512, settings 514, local media library 516, application 518, and token repository 522 that perform similar operations as operating system 112, settings 114, local media library 116, application 118, and token repository 122, as described above with respect to user device 110.

In some implementations, user device 510 and user device 110 can be used or owned by the same user and may be associated with the same user media account. The user can enable or grant application 518 access to the user's media account, including local media library 516 and the user's account with network media service 142 in a similar manner as described above with reference to FIG. 1. The user can revoke or disable application 518's access to the user's media account through a settings GUI presented by operating system 512, as described above with reference to FIG. 2 and FIG. 3.

In some implementations, an application's access to a user's media account can be disabled or revoked through network media service 142. For example, a user can use a web browser application to access an account administration web page provided by network media service 142. The user can login to network media service 142 through the web browser on a computing device by providing the user's authentication information (e.g., user name and password). After the user is authenticated with network media service 142, the user can navigate the web browser to a privacy settings administration web page to adjust the privacy settings associated with the user's media account, as illustrated by FIG. 4A and FIG. 4B.

In some implementations, network media service 142 can receive user input identifying an application for which access to the user's media account should be revoked, as described above with reference to FIG. 4A. In response to receiving the user input, network media service 142 can determine device identifiers for all user devices in token database 144 that are associated with the application identifier of the selected application and the user identifier of the user who is logged into network media service 142. Network media service 142 can invalidate (e.g., store data indicating that the token is invalid or delete the token) all access tokens stored in token database 144 that are associated with the application identifier of the selected application and the user identifier of the user who is logged into network media service 142. For example, network media service 142 can store a timestamp in association with an application identifier and the user identifier indicating the date and/or time when a token was issued to an application identified by the application identifier. Network media service 142 can store a timestamp in association with an application identifier and the user identifier indicating the date and/or time when a token previously issued to an application identified by the application identifier was revoked by the identified user. Network media service 142 can determine that the token is invalid if the revocation timestamp associated with application identifier and user identifier is later (e.g., more recent) than the token issuance timestamp.

In some implementations, network media service 142 can send an access revocation notification 502 to each device corresponding to the determined device identifiers. The access revocation notification 502 can include the application identifier corresponding to the application for which access to the user's media account is being revoked. For example, network media service 142 can send access revocation notification 502 to both user device 110 and user device 510 to revoke application 118's access and application 518's access to the user's media account.

Upon receiving revocation notification 502, operating system 112 on user device 110 can change settings 114 to indicate that application 118 is not authorized to access local media library 116. Operating system 112 can also delete the token associated with the application identifier received in access revocation notification 502 from token repository 122.

Similarly, upon receiving revocation notification 502, operating system 512 on user device 510 can change settings 514 to indicate that application 518 is not authorized to access local media library 516. Operating system 512 can also delete the token associated with the application identifier received in access revocation notification 502 from token repository 522. However, in some cases, user device 510 may be offline and/or otherwise unable to receive revocation notification 502. If user device 510 does not receive revocation notification 502, operation system 512 may not change settings 514 to indicate that application 518 is not authorized to access local media library 516 and the token associated with the application identifier for application 518 may not be deleted. In this case, application 518 may request access to the user's account with network media service 142 using the revoked token. However, since network media service 142 has stored the timestamp indicating when the token associated with application 518 was issued and revoked, network media service 142 can compare the token issuance timestamp to the token revocation timestamp to determine if the token used by application 518 is still valid. If the revocation timestamp is later than the token issuance timestamp, network media service 142 can determine that the token is invalid and send another revocation notification 502 to all user devices associated with the corresponding user identifier. The receiving devices can then prevent application 518 from accessing the local media libraries by adjusting settings 514, as described above.

If the revocation timestamp is earlier than the token issuance timestamp (e.g., the token was reissued after an earlier revocation), then network media service 142 can determine that the token is valid (or reissue the token, or issue a new token) and allow application 518 to access the user's account with network media service 142.

In some implementations, network media service 142 can receive user input identifying an application instance on a particular user device for which access to the user's media account should be revoked, as described above with reference to FIG. 4B. For example, instead of invalidating all access tokens in token database 144 associated with the identifier of the selected application and the identifier for the logged in user, network media service 142 can invalidate the access token associated with the application identifier and the device identifier in token database 144 for the selected application on the selected user device. Thus, the access token associated with a particular application instance on a particular device can be invalidated instead of invalidating all application instances on all user devices associated with the logged in user.

After invalidating the token for the selected application instance on the selected user device, network media service 142 can send revocation notification 502 to the selected user device. For example, the user can select to revoke application 518's access to the user's media account. Network media service 142 can send revocation notification 502 to user device 510 (e.g., instead of all user devices). Revocation notification 502 can identify application 518, for example. Upon receiving revocation notification 502, operating system 512 on user device 510 can change settings 514 to indicate that application 518 is not authorized to access local media library 516. Operating system 512 can also delete the token associated with the application identifier for application 518 received in access revocation notification 502 from token repository 522. Thus, application 518 on user device 510 will no longer be able to access local media library 516 on user device 510 and will no longer be able to access the user's account with network media service 142.

In some implementations, the systems above can revoke an application's access to a user's media account in response to other user activities. For example, when a user signs out of the user's media account and/or signs out of the user's account with the network media service on a user device, the operating system of the user device can notify the network media service that the user has signed out of the user's account. The notification can, for example, include a user identifier for the user. In response to receiving the notification, the network media service can revoke all access tokens issued for all applications associated with the user identifier. However, the operating system may not change the local access settings. Thus, authorized applications on the user device may still access the local media library. Deletion of a media application corresponding to the network media service may be treated the same as the user signing out of the user's account with network media service.

In some implementations, when the user changes their password to the user's media account and/or the user's account with the network media service, the systems described above can revoke all access tokens issued for all applications associated with the user identifier. In some implementations, when the user's media account and/or the user's account with the network media service is not in good standing (e.g., the user has failed to pay a renewal for a subscription), the systems described above can revoke all access tokens issued for all applications associated with the user identifier. These revocations can be initiated from the user device and/or from the network media service, as described with respect to the systems above and the processes below.

In some implementations, a group of applications can be granted access to the user's media account. For example, instead of managing access to the user's media account on an individual application basis (e.g., per application identifier), the systems described above can manage access to the user's media account on an application vendor basis (e.g., per vendor identifier). For example, an application vendor may create a suite or group of applications that may use data from the user's media account to provide various services to the user. Instead of controlling access to the user's media account with respect to each individual application and keeping track of multiple application identifiers, the systems described above can control access to the user's media account for the group of applications provided by the application vendor. This can be accomplished in the above systems by substituting an application vendor identifier for the application specific identifiers described above. Each application in a group of vendor applications can request access to the user's media account by providing a vendor identifier to the system. The system can control (e.g., grant and revoke) access based on the vendor identifier. Since the vendor identifier is shared across all applications provided by the vendor, access granted to the first vendor application can allow all vendor applications to access the user's media account. Similarly, revocation of access for one vendor application would result in revocation of access for all vendor applications.

Example Processes

Figure 6:
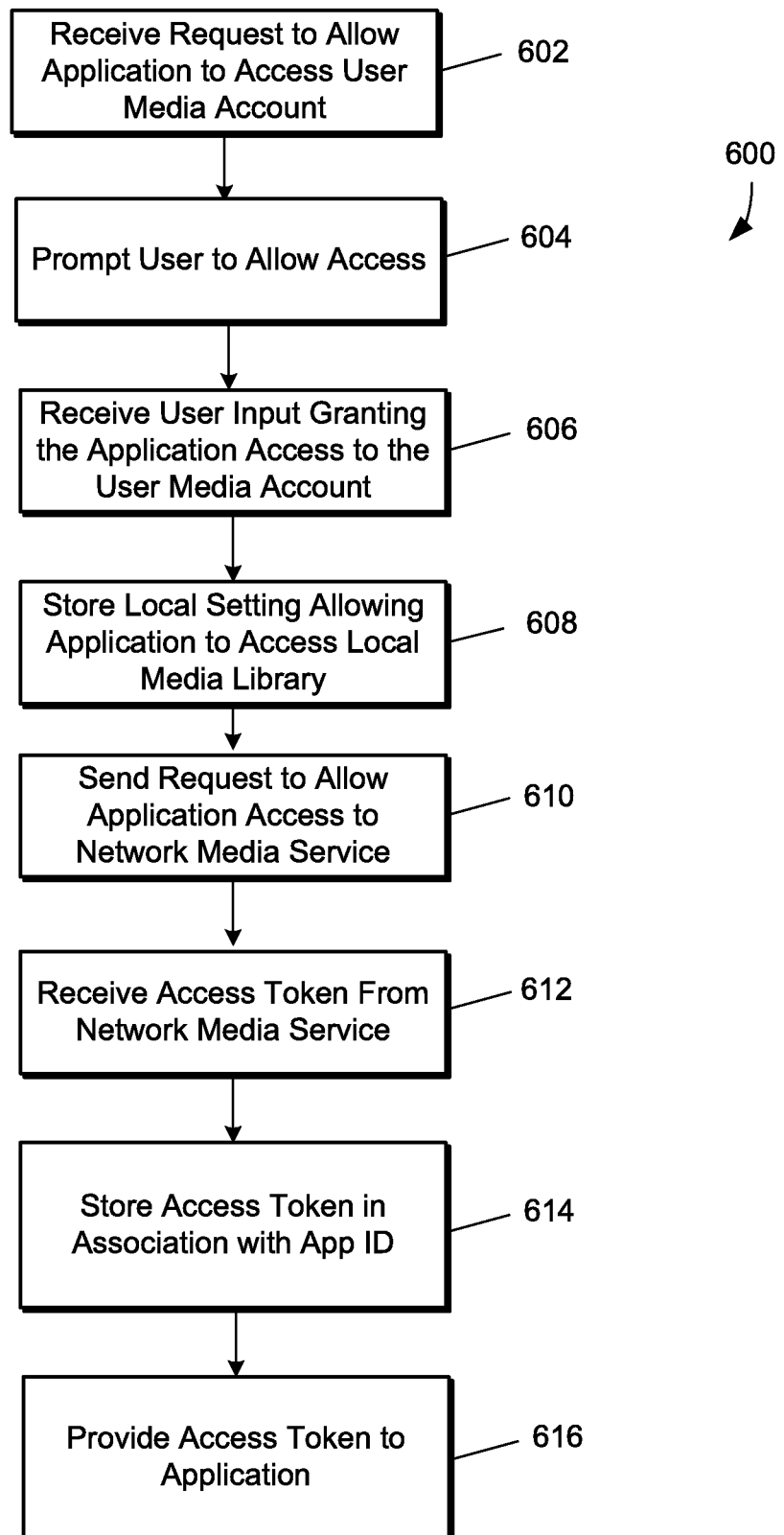
FIG. 6 is flow diagram of an example process for enabling an application to access a user's media account from a user device.

FIG. 6 is flow diagram of an example process 600 for enabling an application to access a user's media account from a user device. For example, process 600 can be performed by a computing device or system of computing devices, as described above.

At step 602, a computing device can receive a request to allow an application to access a user's media account. For example, an application on a user device may send a request to the operating system of the user device requesting access to the user's media account. For example, the user's media account can include a local media library stored on the user device and/or a user account with a network media service.

At step 604, the computing device can prompt the user to allow the application to access the user's media account. For example, the operating system of the user device can present on a display of the user device a graphical prompt requesting the user to allow the requesting application access to the user's media account.

At step 606, the computing device can receive user input granting the application access to the user's media account. For example, the user can provide input indicating that the user would like to grant the application access to the user's media account.

At step 608, the computing device can store a local setting on the user device allowing the application to access the local media library. For example, the operating system of the user device can receive the user input granting the application access to the user's media account and store a setting that indicate that the application is allowed to access the user's media account. When the application subsequently attempts to invoke an operating system API for accessing the local media library stored on the user device, the operating system can determine whether to allow the application access to the local media library based on the setting. If the setting indicates the application should be allowed access to the user's media account, the operating system can allow the application to access the local media library. If the setting indicates that the application should not be allowed to access the user's media account, the operating system can prevent the application from accessing the local media library.

At step 610, the computing device can send a request to the network media service to allow the application to access the user's account at the network media service. For example, in response to receiving the user input allowing the application to access the user's media account, the operating system of the user device can send a request to the network media service requesting an access token for accessing the user's account at the network media service. The request can include a user identifier for the user of the user device, a device identifier for the user device, and/or an application identifier for the application requesting access to the user's media account. Upon receipt of the request the network media service can generate an access token for the application instance on the user device and store the access token in token database 144, as described above.

At step 612, the computing device can receive the access token from the network media service. For example, the operating system on the user device can receive the access token from the network media service.

At step 614, the computing device can store the access token in association with the application identifier. For example, upon receipt of the access token from the network media service, the operating system on the user device can store the access token in association with the application identifier for the requesting application.

At step 616, the computing device can provide the access token to the requesting application. For example, the operating system of the user device can send the access token to the requesting application. The requesting application can then use the access token to access the user's account at the network media service.

Figure 7:
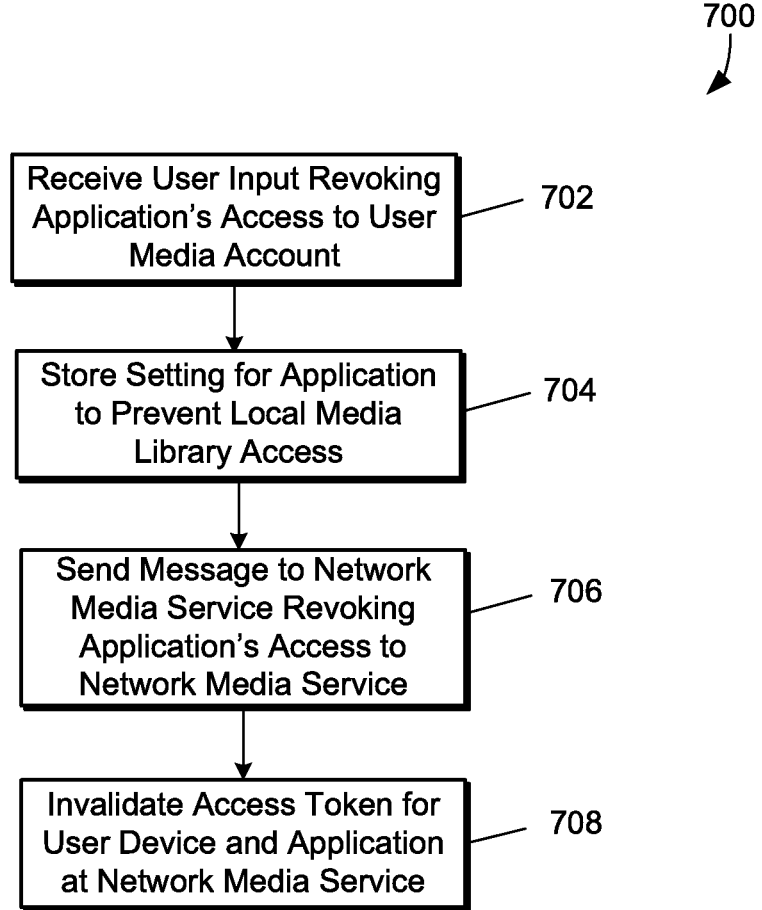
FIG. 7 is an example process for revoking an application's access to the user's media account from a user device.

FIG. 7 is an example process 700 for revoking an application's access to the user's media account from a user device. For example process 700 can be performed by system 100, 300, and/or 500 described above.

At step 702, a computing device can receive user input revoking an application's access to a user's media account. For example, the user can invoke a settings GUI of the operating system of a user device to view the media account access settings for applications on the user device, as described above with reference to FIG. 2. The user can provide input to the settings GUI to revoke an application's access to the user's media account and the operating system can receive the input specifying the new application setting indicating that that application does not have permission to access the user's media account.

At step 704, the computing device can store the user media account access setting for the application to prevent local media library access. For example, the operating system of the user device can store privacy setting data indicating that the application is not allowed to access the user's media account. When the application later attempts to access the local media library on the user device through the operating system, the operating system can determine whether the application should be allowed to access the local media library based on the user media account access setting associated with the application. When the access setting indicates that the application is not allowed access to the user's media account, the operating system can prevent the application from accessing the local media library.

At step 706, the computing device can send a message to a network media service indicating that the application's access to the user's account at the network media service should be revoked. For example, the message can identify the user of the user device, the user device, and/or the application for which access is being revoked. The message can include the access token previously provided to the application.

At step 708, a server device can invalidate the access token associated with the user device and application at the network media service. For example, the network media service running on the server device can receive the message sent at step 706. The network media service can find a token entry (e.g., record) in the token database that corresponds to the user, user device, and application identified in the message and invalidate the token by deleting the token entry or storing data in the token entry in the token database indicating that the token is invalid. When the application, or other client, attempts to access the user's account with the network media service using the invalid token, the network media service can prevent the application, or the client, from accessing the user's account with the network media service.

Figure 8:
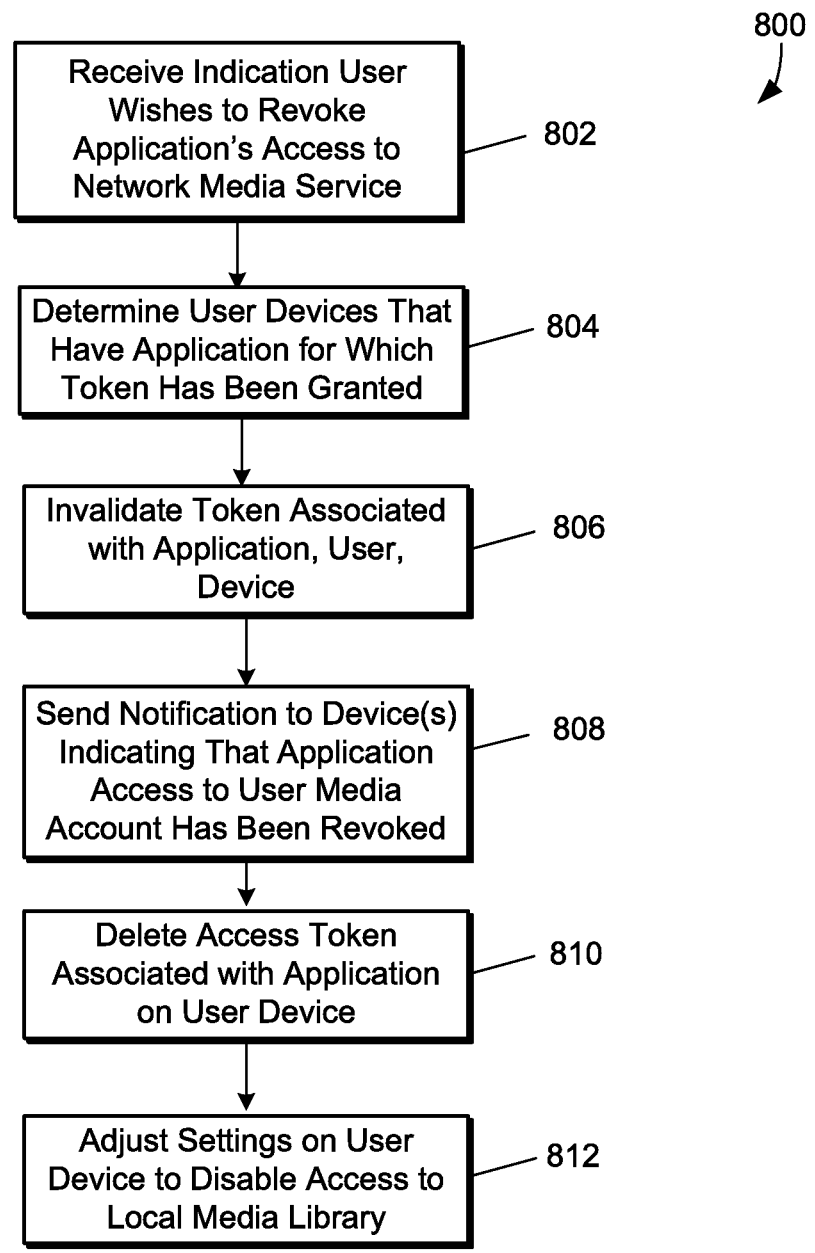
FIG. 8 is an example process for revoking an application's access to the user's media account from a network media service.

FIG. 8 is an example process 800 for revoking an application's access to the user's media account from a network media service. For example process 800 can be performed by system 100, 300, and/or 500 described above.

At step 802, a server device can receive an indication that a user wishes to revoke an application's access to the user's account with the network media service. For example, the user can login (e.g., input user identifier and password) to the network media service to access a GUI of the network media service running on the server device through a web browser running on a user device. The network media service can, for example, serve a user account administrative web page (e.g., account settings page) to the browser on the user device. The user can provide input to the web page through the browser to revoke an application's access to the user's media account, including the user's account with the network media service and local media libraries on one or more of the user's devices.

At step 804, the server device can determine user devices that have an application for which an access token has been granted. For example, the network media service can determine token entries associated with the user identifier and application identifier corresponding to the application specified by the user at step 802 and obtain from the token entries device identifiers corresponding to devices that have applications corresponding to the application identifier that have been granted access to the user's media account.

At step 806, the server device can invalidate tokens associated with the application, user, and device identifiers. For example, the network media service can delete the access tokens associated with the selected application, user, and devices. The network media service can store data (e.g., a flag, a Boolean value, revocation timestamp, etc.) indicating that the access tokens are invalid. For example, the data indicating that the access tokens are invalid can be stored in the access token database in association with the application identifier, device identifier, user identifier and access token, as described above. The network media service can determine a token is invalid when the token revocation timestamp is later (e.g., more recent) than the token issuance timestamp.

At step 808, the server device can send a notification to the user devices corresponding to the device identifiers indicating that the application's access to the user's media account has been revoked. For example, the network media service can send a message to each user device that identifies the application for which access to the user's media account is being revoked.

At step 810, a user device can delete the access token associated with the application on the user device. For example, the operating system on each user device that receives the message sent at step 808 can delete the locally stored access token associated with the application identified in the message.

At step 812, the user device can adjust the settings on the user device to disable the application's access to the local media library. For example, the operating system on each user device that receives the message sent at step 808 can adjust the privacy settings stored locally on the user device to indicate that the application identified in the message is no longer allowed to access the user's media account. When the application later attempts to access the local media library, the operating system on the user device can determine based on the settings that the application is not allowed access to the user's media account, including the local media library, and can prevent the application from accessing the local media library based on the settings.

In some implementations, the user device may not receive the token revocation notification sent by server device at step 808. Thus, the user device may not perform steps 810 and 812 to delete the token and change the settings of the user device to prevent the application from accessing the local media library on the user device. In this case, the application may still have access to the local media library on the user device and may attempt to use the token after token revocation to access the user's media account with the network media service. When the application sends the token to the network media service, the network media service can compare the token issuance timestamp for the token and the token revocation timestamp for the token to determine that the token provided by the application is invalid. When the network media service determines that the token is invalid, the network media service can send a notification to the user devices associated with the user identifier to revoke the token and/or the user's access to the local media library, as described above at step 808. The receiving user devices can then perform steps 810 and 812 to revoke the application's access to the local media library and the user's network media account, as described above. If the issuance timestamp is more recent than the revocation timestamp, then the network media service can reissue an access token (e.g., issue a new access token) for the requesting application, as described above.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 9:
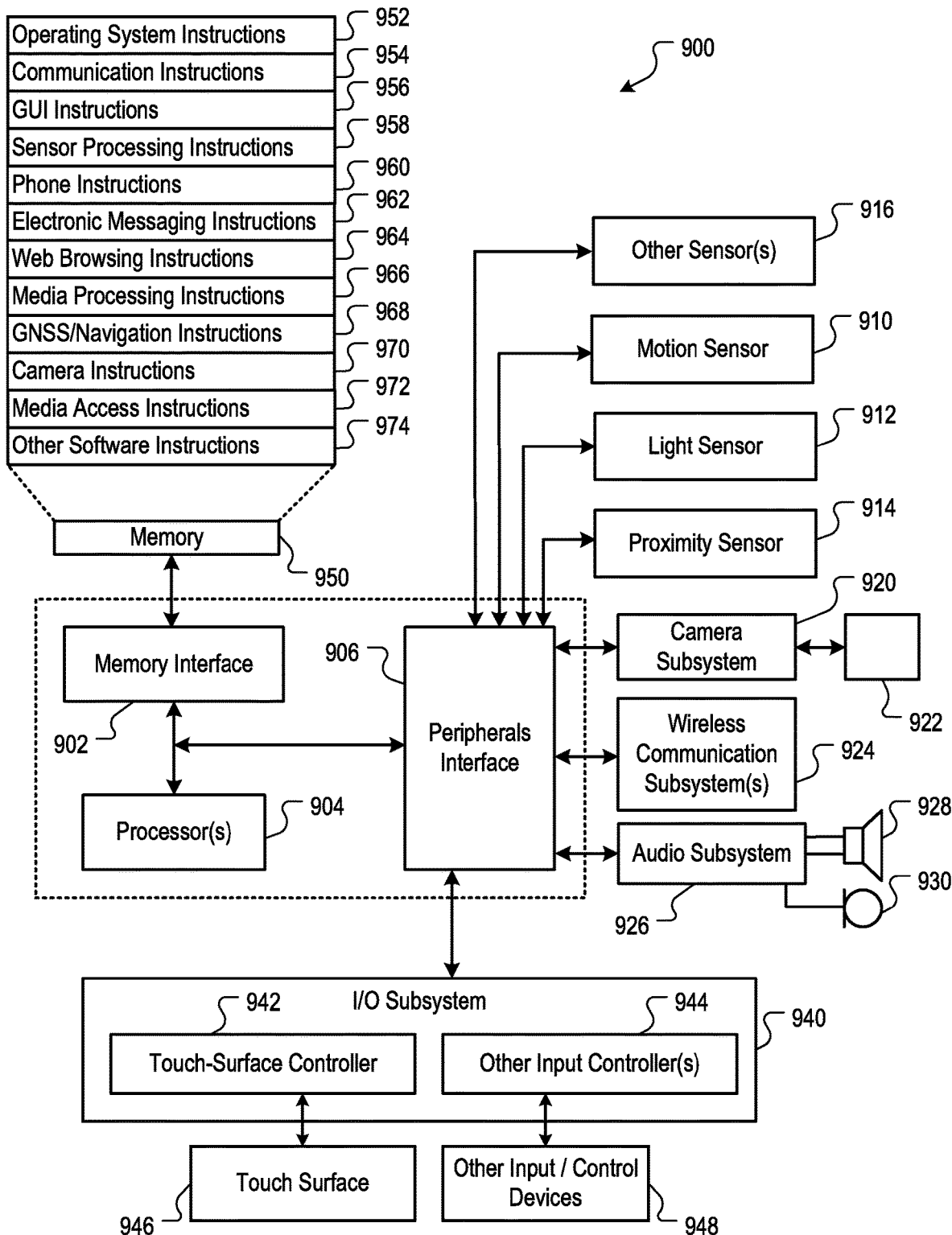
FIG. 9 is a block diagram of an exemplary system architecture implementing the features and processes of FIGS. 1-8.

FIG. 9 is a block diagram of an example computing device 900 that can implement the features and processes of FIGS. 1-8. The computing device 900 can include a memory interface 902, one or more data processors, image processors and/or central processing units 904, and a peripherals interface 906. The memory interface 902, the one or more processors 904 and/or the peripherals interface 906 can be separate components or can be integrated in one or more integrated circuits. The various components in the computing device 900 can be coupled by one or more communication buses or signal lines.

Sensors, devices, and subsystems can be coupled to the peripherals interface 906 to facilitate multiple functionalities. For example, a motion sensor 910, a light sensor 912, and a proximity sensor 914 can be coupled to the peripherals interface 906 to facilitate orientation, lighting, and proximity functions. Other sensors 916 can also be connected to the peripherals interface 906, such as a global navigation satellite system (GNSS) (e.g., GPS receiver), a temperature sensor, a biometric sensor, magnetometer or other sensing device, to facilitate related functionalities.

A camera subsystem 920 and an optical sensor 922, e.g., a charged coupled device (CCD) or a complementary metal-oxide semiconductor (CMOS) optical sensor, can be utilized to facilitate camera functions, such as recording photographs and video clips. The camera subsystem 920 and the optical sensor 922 can be used to collect images of a user to be used during authentication of a user, e.g., by performing facial recognition analysis.

Communication functions can be facilitated through one or more wireless communication subsystems 924, which can include radio frequency receivers and transmitters and/or optical (e.g., infrared) receivers and transmitters. The specific design and implementation of the communication subsystem 924 can depend on the communication network(s) over which the computing device 900 is intended to operate. For example, the computing device 900 can include communication subsystems 924 designed to operate over a GSM network, a GPRS network, an EDGE network, a Wi-Fi or WiMax network, and a Bluetooth™ network. In particular, the wireless communication subsystems 924 can include hosting protocols such that the device 100 can be configured as a base station for other wireless devices.

An audio subsystem 926 can be coupled to a speaker 928 and a microphone 930 to facilitate voice-enabled functions, such as speaker recognition, voice replication, digital recording, and telephony functions. The audio subsystem 926 can be configured to facilitate processing voice commands, voiceprinting and voice authentication, for example.

The I/O subsystem 940 can include a touch-surface controller 942 and/or other input controller(s) 944. The touch-surface controller 942 can be coupled to a touch surface 946. The touch surface 946 and touch-surface controller 942 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 946.

The other input controller(s) 944 can be coupled to other input/control devices 948, such as one or more buttons, rocker switches, thumb-wheel, infrared port, USB port, and/or a pointer device such as a stylus. The one or more buttons (not shown) can include an up/down button for volume control of the speaker 928 and/or the microphone 930.

In one implementation, a pressing of the button for a first duration can disengage a lock of the touch surface 946; and a pressing of the button for a second duration that is longer than the first duration can turn power to the computing device 900 on or off. Pressing the button for a third duration can activate a voice control, or voice command, module that enables the user to speak commands into the microphone 930 to cause the device to execute the spoken command. The user can customize a functionality of one or more of the buttons. The touch surface 946 can, for example, also be used to implement virtual or soft buttons and/or a keyboard.

In some implementations, the computing device 900 can present recorded audio and/or video files, such as MP3, AAC, and MPEG files. In some implementations, the computing device 900 can include the functionality of an MP3 player, such as an iPod™. The computing device 900 can, therefore, include a 36-pin connector that is compatible with the iPod. Other input/output and control devices can also be used.

The memory interface 902 can be coupled to memory 950. The memory 950 can include high-speed random access memory and/or non-volatile memory, such as one or more magnetic disk storage devices, one or more optical storage devices, and/or flash memory (e.g., NAND, NOR). The memory 950 can store an operating system 952, such as Darwin, RTXC, LINUX, UNIX, OS X, WINDOWS, or an embedded operating system such as VxWorks.

The operating system 952 can include instructions for handling basic system services and for performing hardware dependent tasks. In some implementations, the operating system 952 can be a kernel (e.g., UNIX kernel). In some implementations, the operating system 952 can include instructions for performing voice authentication. For example, operating system 952 can implement the media account access management features as described with reference to FIGS. 1-8.

The memory 950 can also store communication instructions 954 to facilitate communicating with one or more additional devices, one or more computers and/or one or more servers. The memory 950 can include graphical user interface instructions 956 to facilitate graphic user interface processing; sensor processing instructions 958 to facilitate sensor-related processing and functions; phone instructions 960 to facilitate phone-related processes and functions; electronic messaging instructions 962 to facilitate electronic-messaging related processes and functions; web browsing instructions 964 to facilitate web browsing-related processes and functions; media processing instructions 966 to facilitate media processing-related processes and functions; GNSS/Navigation instructions 968 to facilitate GNSS and navigation-related processes and instructions; and/or camera instructions 970 to facilitate camera-related processes and functions.

The memory 950 can store other software instructions 972 to facilitate other processes and functions, such as the media account access management processes and functions as described with reference to FIGS. 1-8.

The memory 950 can also store other software instructions 974, such as web video instructions to facilitate web video-related processes and functions; and/or web shopping instructions to facilitate web shopping-related processes and functions. In some implementations, the media processing instructions 966 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 950 can include additional instructions or fewer instructions. Furthermore, various functions of the computing device 900 can be implemented in hardware and/or in software, including in one or more signal processing and/or application specific integrated circuits.

We claim:

1. A method comprising:
receiving, by a computing device, a request to allow a particular application of a plurality of applications installed on the computing device access to a network media account of a user of the computing device;
presenting, by the computing device, a message requesting the user to allow the particular application access to the network media account;
receiving, by the computing device, a first input from the user granting the particular application access to the network media account while refraining from granting access to at least another one of the plurality of applications;
in response to receiving the first input, enabling the particular application to access a local media library associated with the user on the computing device and obtaining a token from a network media service for accessing the network media account managed by the network media service; and
providing the token to the particular application, wherein the particular application uses the token to access media items provided by the network media service through the network media account associated with the user.

2. The method of claim 1, wherein obtaining the token from the network media service comprises:
sending a request to the network media service to obtain the token for accessing the network media service through the network media account; and
receiving the token from the network media service.

3. The method of claim 1, wherein the token allows a specific device to access the network media account.

4. The method of claim 1, wherein the token allows a specific application to access the network media account.

5. The method of claim 1, further comprising:
receiving, by the computing device, a second input revoking the particular application's access to the network media account;
in response to receiving the second input, preventing the particular application from accessing the local media library and sending a message to the network media service to revoke the particular application's access to the network media account, where, in response to receiving the message, the network media service invalidates the token.

6. The method of claim 5, wherein the message includes the token, a first identifier for the user, a second identifier for the computing device, a third identifier for the particular application, or a combination thereof.

7. A non-transitory computer-readable medium including one or more sequences of instructions that, when executed by one or more processors, cause the processors to perform operations comprising:
receiving, by a computing device, a request to allow a particular application of a plurality of applications installed on the computing device access to a network media account of a user of the computing device;
presenting, by the computing device, a message requesting the user to allow the particular application access to the network media account;
receiving, by the computing device, a first input from the user granting the particular application access to the network media account while refraining from granting access to at least another one of the plurality of applications;
in response to receiving the first input, enabling the particular application to access a local media library associated with the user on the computing device and obtaining a token from a network media service for accessing the network media account managed by the network media service; and
providing the token to the particular application, wherein the particular application uses the token to access media items provided by the network media service through the network media account associated with the user.

8. The non-transitory computer-readable medium of claim 7, wherein the instructions that cause obtaining the token from the network media service include instructions that cause:

sending a request to the network media service to obtain the token for accessing the network media service through the network media account; and receiving the token from the network media service.

9. The non-transitory computer-readable medium of claim 7, wherein the token allows a specific device to access the network media account.

10. The non-transitory computer-readable medium of claim 7, wherein the token allows a specific application to access the network media account.

11. The non-transitory computer-readable medium of claim 7, wherein the instructions cause:

receiving, by the computing device, a second input revoking the particular application's access to the network media account;

in response to receiving the second input, preventing the particular application from accessing the local media library and sending a message to the network media service to revoke the particular application's access to the network media account, where, in response to receiving the message, the network media service invalidates the token.

12. The non-transitory computer-readable medium of claim 11, wherein the message includes the token, a first identifier for the user, a second identifier for the computing device, a third identifier for the particular application, or a combination thereof.

13. A system comprising:

one or more processors; and a non-transitory computer-readable medium including one or more sequences of instructions that, when executed by the one or more processors, cause the processors to perform operations comprising:

receiving, by a computing device, a request to allow a particular application of a plurality of applications installed on the computing device access to a network media account of a user of the computing device;

presenting, by the computing device, a message requesting the user to allow the particular application access to the network media account;

receiving, by the computing device, a first input from the user granting the particular application access to the network media account while refraining from granting access to at least another one of the plurality of applications;

in response to receiving the first input; enabling the particular application to access a local media library associated with the user on the computing device and obtaining a token from a network media service for accessing the network media account managed by the network media service; and providing the token to the particular application, wherein the particular application uses the token to access media items provided by the network media service through the network media account associated with the user.

14. The system of claim 13, wherein the instructions that cause obtaining the token from the network media service include instructions that cause:

sending a request to the network media service to obtain the token for accessing the network media service through the network media account; and receiving the token from the network media service.

15. The system of claim 13, wherein the token allows a specific device to access the network media account.

16. The system of claim 13, wherein the token allows a specific application to access the network media account.

17. The system of claim 13, wherein the instructions cause:

receiving, by the computing device, a second input revoking the particular application's access to the network media account;

in response to receiving the second input, preventing the particular application from accessing the local media library and sending a message to the network media service to revoke the particular application's access to the network media account, where, in response to receiving the message, the network media service invalidates the token.

18. The system of claim 17, wherein the message includes the token, a first identifier for the user, a second identifier for the computing device, a third identifier for the particular application, or a combination thereof.

* * * * *